(12) United States Patent
Chang

(10) Patent No.: US 7,854,868 B2
(45) Date of Patent: Dec. 21, 2010

(54) MOLD PROTECTING SYSTEM AND METHOD FOR PROTECTING AN INJECTION MOLDING SYSTEM

(75) Inventor: Han-Chieh Chang, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 176 days.

(21) Appl. No.: 12/250,500

(22) Filed: Oct. 13, 2008

(65) Prior Publication Data

US 2010/0057241 A1 Mar. 4, 2010

(30) Foreign Application Priority Data

Aug. 28, 2008 (CN) .................... 200810304267.4

(51) Int. Cl.
*B29C 45/80* (2006.01)
(52) U.S. Cl. ............ 264/40.1; 264/40.5; 425/150; 425/174; 425/174.6
(58) Field of Classification Search ........ 425/150, 425/165, 174, 589, 590, 174.6; 264/40.1, 264/40.5
See application file for complete search history.

(56) References Cited

U.S. PATENT DOCUMENTS

| 4,418,741 A * | 12/1983 | Bondarenko et al. ........ 164/454 |
| 5,928,578 A * | 7/1999 | Kachnic et al. ............ 264/40.1 |
| 7,118,365 B2 * | 10/2006 | Shirahata et al. ............ 425/139 |

* cited by examiner

*Primary Examiner*—Tim Heitbrink
(74) *Attorney, Agent, or Firm*—Zhigang Ma

(57) ABSTRACT

A mold protecting system for an injection molding machine includes a voltage source, a controller, a first mold, a second mold, a fixed platen, and a movable platen. The first mold is fixed to the movable platen. The second mold is fixed to the fixed platen. The controller from the voltage source to charge the first and second molds, and detects the capacitance between the first and second molds when the distance between the first and second molds equals a pre-set value. If the capacitance between the first and second molds is greater than a reference value, the controller controls the movable platen to stop moving.

9 Claims, 3 Drawing Sheets

MOLD PROTECTING SYSTEM AND METHOD FOR PROTECTING AN INJECTION MOLDING SYSTEM

BACKGROUND

1. Field of the Disclosure

The present disclosure relates to a mold protecting system and a mold protecting method for injection molding machines.

2. Description of the Related Art

Generally, in an injection molding machine, when an injection unit is detached from a molding tool, leftover mold material may remain on the molding tool, which may damage the molds of the molding tool when they are closed again. Various methods are applied for protecting the molds of injection molding machines. For example, a typical all-electric injection molding machine protects its molds according to current change therein. If the current abruptly rises, a controller in the machine will control a movable platen to stop moving. However, the detecting process of the current change takes too long to properly protect the molds.

What is needed, is a more efficient mold protecting system and a mold projecting method.

DETAILED DESCRIPTION OF THE EMBODIMENTS

Figure 1:
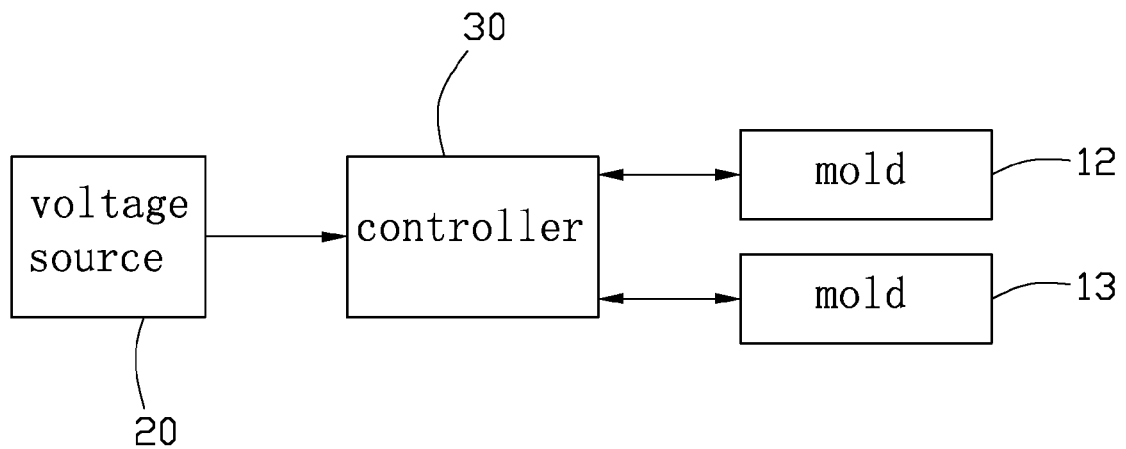
FIG. 1 is a block diagram of an embodiment of a mold protecting system for an injection molding machine.
Figure 2:
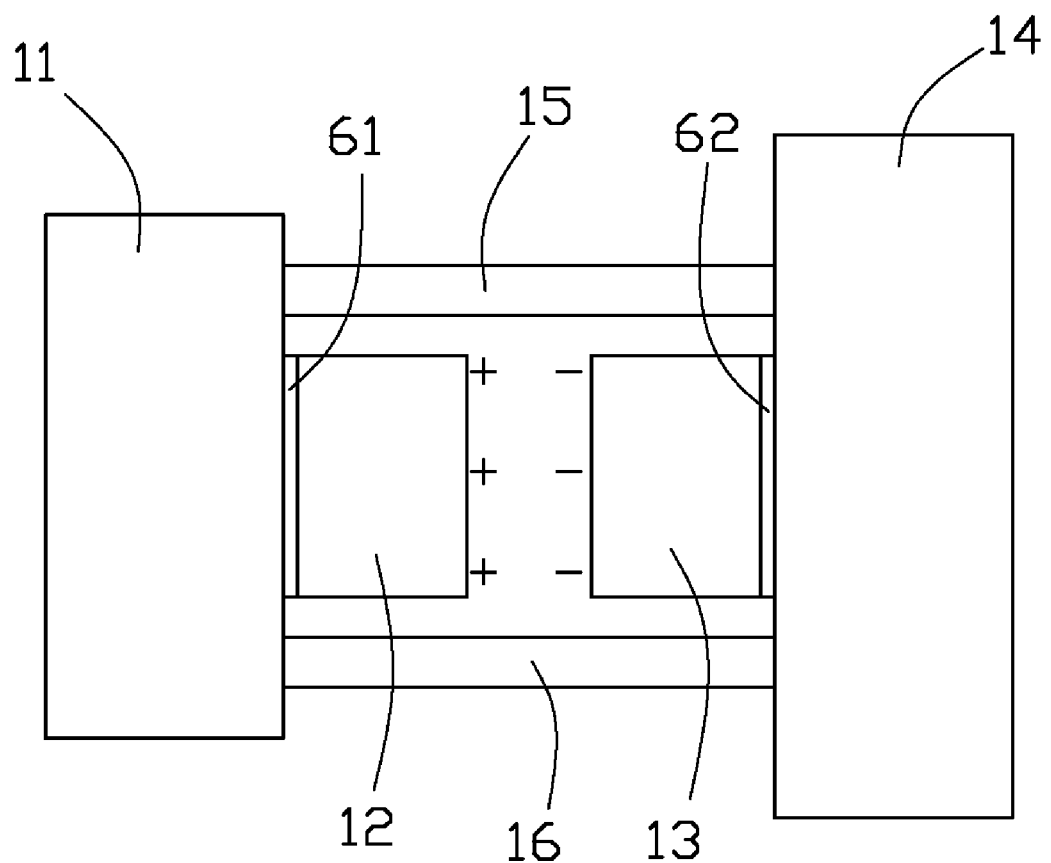
FIG. 2 is a schematic diagram of the mold protecting system of FIG. 1.

Referring to FIGS. 1 and 2, an embodiment of a mold protecting system for an injection molding machine includes a movable platen 11, a first mold 12, a second mold 13, a fixed platen 14, two bars 15, 16, a voltage source 20, and a controller 30.

The first mold 12 is fixed to the movable platen 11. The second mold 13 is fixed to the fixed platen 14 and facing the first mold 12. The bars 15 and 16 are connected between the fixed platen 14 and the movable platen 11. The movable platen 11 is movable towards the fixed platen 14 along the bars 15 and 16. In one embodiment, a first insulation plate 61 is mounted between the movable platen 11 and the first mold 12 for insulating the first mold 12 from the movable platen 11, and a second insulation plate 62 is mounted between the fixed platen 14 and the second mold 13 for insulating the second mold 13 from the fixed platen 14. Many types of insulation plates can be used in one embodiment, such as the insulation plates sold under the trademark BAKELITE, marble plates, and ceramic plates. The controller 30 is electrically connected to the voltage source 20, the first mold 12, and the second mold 13. The voltage source 20 positively charges the first mold 12 and negatively charges the second mold 13 via the controller 30. The controller 30 is further configured for adjusting a distance and detecting a capacitance between the first mold 12 and the second mold 13.

If there is no leftover mold material between the first mold 12 and the second mold 13, the dielectric between the first mold 12 and the second mold 13 is air, and a capacitance $C_0$ between the first mold 12 and the second mold 13 can be expressed by the following equation (1):

$$C_0 = \frac{\varepsilon_0 A}{4\pi d} \quad (1)$$

where d is a pre-set distance between the first mold 12 and the second mold 13, A is a superposition area between the first mold 12 and the second mold 13, and $\varepsilon_0$ is the dielectric constant of air between the first mold 12 and the second mold 13. The capacitance $C_0$ is a reference value.

If there is leftover mold material between the first mold 12 and the second mold 13, the dielectric constant will be greater than $\varepsilon_0$, and is denoted as $\varepsilon$. Therefore, a new capacitance C between the first mold 12 and the second mold 13 can be expressed by the following equation (2):

$$C = \frac{\varepsilon A}{4\pi d} \quad (2)$$

where d is the pre-set distance between the first mold 12 and the second mold 13, A is the superposition area between the first mold 12 and the second mold 13, and $\varepsilon$ is the dielectric constant of the mold material or a combination of the mold material and air between the first mold 12 and the second mold 13.

The controller 30 detects the capacitance between the first mold 12 and the second mold 13 when the distance between the first mold 12 and the second mold 13 equals d. The controller 30 controls the movement of the movable platen 11 according to the capacitance between the first mold 12 and the second mold 13. If the capacitance between the first mold 12 and the second mold 13 is greater than the reference $C_0$, the controller 30 determines that there is leftover mold material between the first mold 12 and the second mold 13. The controller 30 controls the movable platen 11 to stop moving, which indicates a user to clear the leftover mold material. If the capacitance between the first mold 12 and the second mold 13 equals the reference $C_0$, the controller 30 determines that there is no leftover mold material between the first mold 12 and the second mold 13. The controller 30 controls the movable platen 11 to continue towards the fixed platen 14 along the bars 15 and 16, until the mold closing is finished. It is understood that the pre-set distance d should be determined according to product size for detecting the dielectric between the first mold 12 and the second mold 13.

Figure 3:
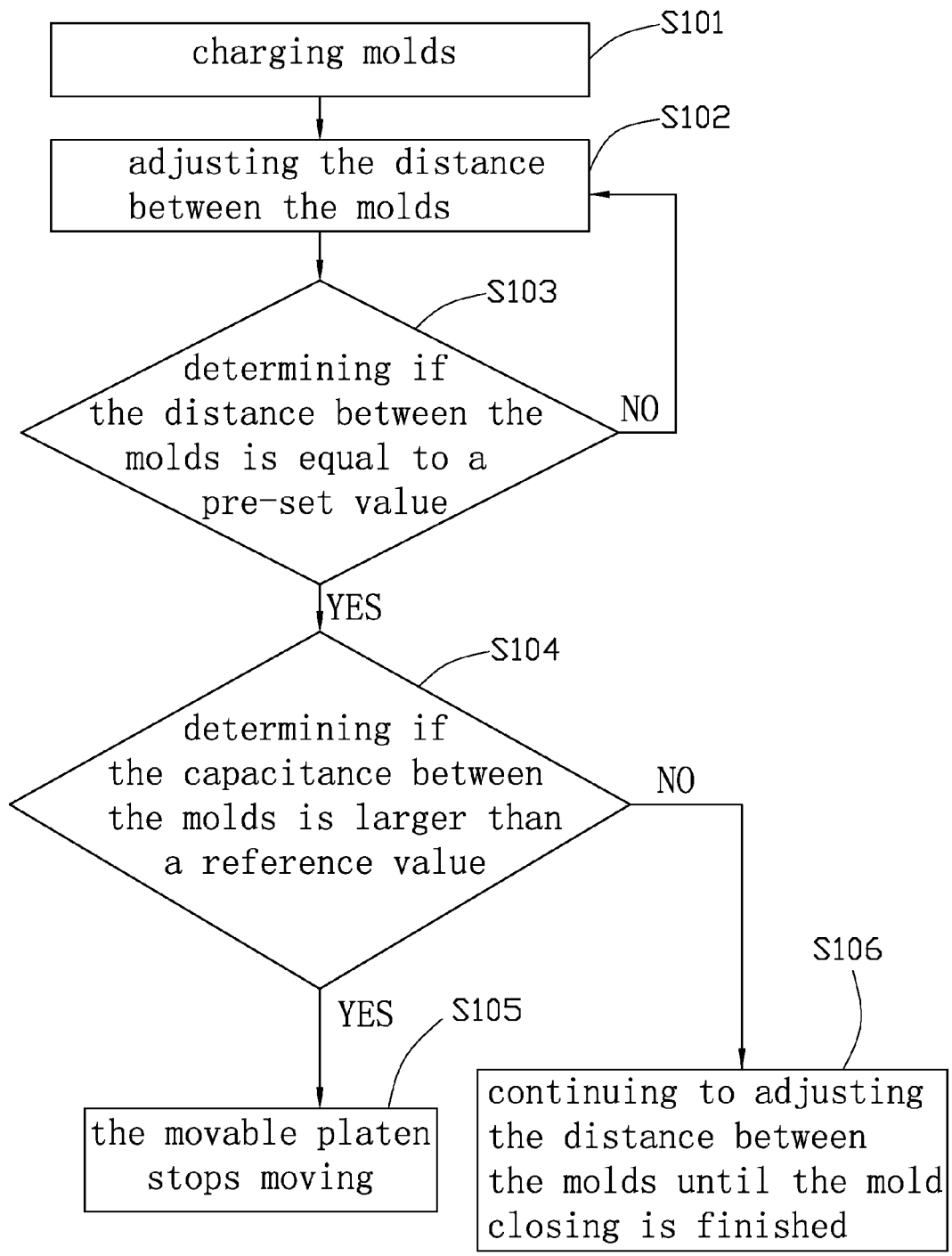
FIG. 3 is a flowchart of an embodiment of a mold protecting method.

Referring to FIG. 3, a mold protecting method applied to the above-mentioned mold projecting system includes the following blocks described below. Depending on the embodiment, certain of the blocks described below may be removed, others may be added, and the sequence of blocks may be altered.

In block S101, the voltage source 20 positively charges the first mold 12 and negatively charges the second mold 13 via the controller 30.

In block S102, the controller 30 controls the movable platen 11 towards the fixed platen 14 along the bars 15 and 16, for adjusting the distance between the movable platen 11 and the fixed platen 14.

In block S103, the controller 30 determines if the distance between the molds 12 and 13 equals the pre-set value d. If the distance between the molds 12 and 13 equals the pre-set value d, the procedure continues to block S104, otherwise, the procedure returns to block S102.

In block S104, the controller 30 detects the capacitance between the molds 12 and 13, and determines if the capacitance between the molds 12 and 13 is greater than the reference value $C_0$. If the capacitance between the molds 12 and 13 is greater than the reference value $C_0$, the procedure continues to block S105, otherwise, the procedure continues to block S106.

In block S105, the controller 30 controls the movable platen 11 to stop moving.

In block S106, the controller 30 controls the movable platen 11 to move towards the fixed platen 14 along the bars 15 and 16, until the mold closing is finished.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A mold protecting system for an injection molding machine, comprising:
    a movable platen;
    a fixed platen;
    a first mold fixed to the movable platen;
    a second mold fixed to the fixed platen, and facing the first mold;
    a voltage source; and
    a controller being connected to the voltage source and the first and second molds, to charge the first and second molds;
        wherein the controller detects capacitance between the first and second molds upon the condition that a distance between the first and second molds equals a pre-set value; the controller controls the movable platen to stop moving upon the condition that the capacitance between the first and second molds is greater than a reference value.

2. The mold protecting system of claim 1, further comprising a first insulation plate positioned between the movable platen and the first mold, and a second insulation plate positioned between the fixed platen and the second mold.

3. The mold protecting system of claim 2, wherein the first and second insulation plates are made of marble.

4. The mold protecting system of claim 2, wherein the first and second insulation plates are made of ceramic.

5. The mold protecting system of claim 1, wherein the reference value is the capacitance between the first and second molds upon the condition that the distance between the first and second molds equals the pre-set value, and a dielectric between the first and second molds is air.

6. A mold protecting method applied to a mold protecting system, the method comprising:
    providing the mold protecting system comprising:
        a movable platen;
        a fixed platen;
        a first mold fixed to the movable platen;
        a second mold fixed to the fixed platen, and facing the first mold;
        a voltage source; and
        a controller
    controlling voltage from the voltage source to charge the first and second molds;
    controlling the movable platen towards the fixed platen until the distance between the first and second molds equals a pre-set value;
    detecting a capacitance between the first and second molds;
    determining if the capacitance between the first and second molds equals a reference value;
    controlling the movable platen to stop moving upon the condition that the capacitance between the first and second molds is greater than the reference value; and
    controlling the movable platen towards the fixed platen upon the condition that the capacitance between the first and second molds equals the reference value.

7. The mold protecting method of claim 6, wherein the movable platen is insulated from the first mold by a first insulation plate, and the fixed platen is insulated from the second mold by a second insulation plate.

8. The mold protecting method of claim 7, wherein the first and second insulation plates are made of marble.

9. The mold protecting method of claim 7, wherein the first and second insulation plates are made of ceramic.

* * * * *